United States Patent
Kim et al.

(10) Patent No.: US 7,998,623 B2
(45) Date of Patent: Aug. 16, 2011

(54) ELECTROLYTE FOR LITHIUM ION SECONDARY BATTERY AND LITHIUM ION SECONDARY BATTERY INCLUDING THE SAME

(75) Inventors: Jin-Hee Kim, Youngin-si (KR); Jin-Sung Kim, Youngin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1503 days.

(21) Appl. No.: 11/239,691

(22) Filed: Sep. 30, 2005

(65) Prior Publication Data

US 2006/0078792 A1    Apr. 13, 2006

(30) Foreign Application Priority Data

Oct. 1, 2004   (KR) .................. 10-2004-0078186

(51) Int. Cl.
*H01M 6/16* (2006.01)
*H01M 6/04* (2006.01)

(52) U.S. Cl. ........................... 429/324; 429/199

(58) Field of Classification Search ............ 429/231.95
See application file for complete search history.

(56) References Cited

U.S. PATENT DOCUMENTS

| | | | |
|---|---|---|---|
| 6,068,950 A | 5/2000 | Gan et al. | |
| 6,475,680 B1 | 11/2002 | Arai et al. | |
| 2003/0118913 A1 | 6/2003 | Takami et al. | |
| 2003/0157411 A1* | 8/2003 | Jung et al. | 429/317 |
| 2004/0021501 A1 | 2/2004 | Das et al. | |
| 2004/0038130 A1 | 2/2004 | Imachi et al. | |
| 2004/0072073 A1* | 4/2004 | Okochi et al. | 429/231.1 |
| 2004/0185347 A1* | 9/2004 | Kim et al. | 429/326 |
| 2005/0026043 A1* | 2/2005 | Kang et al. | 429/330 |
| 2005/0196664 A1* | 9/2005 | Shimoyamada et al. | 429/94 |
| 2006/0177742 A1 | 8/2006 | Abe et al. | |
| 2006/0257743 A1 | 11/2006 | Kuratomi et al. | |

FOREIGN PATENT DOCUMENTS

| | | |
|---|---|---|
| CN | 1532986 | 9/2004 |
| JP | 2001-256996 | 9/2001 |
| JP | 2002-033117 | 1/2002 |
| JP | 2003-249264 | 9/2003 |
| JP | 2003-297426 | 10/2003 |
| JP | 2004-039642 | 2/2004 |
| JP | 2004-172084 | 6/2004 |
| KR | 10-2001-0082428 A | 8/2001 |

(Continued)

*Primary Examiner* — Patrick Joseph Ryan
*Assistant Examiner* — Muhammad Siddiquee
(74) *Attorney, Agent, or Firm* — Robert E. Bushnell, Esq.

(57) ABSTRACT

An electrolyte includes a lithium salt, a non-aqueous organic solvent, gamma-butyrolactone and halogenated toluene represented by the following formula 1:

[Formula 1]

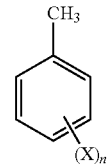

wherein X represents at least one element selected from the group consisting of F, Cl, Br and I, and n represents an integer of 1 to 5. The lithium ion secondary battery including the electrolyte provides improved safety under overcharge and high-temperature storage conditions.

21 Claims, 1 Drawing Sheet

FOREIGN PATENT DOCUMENTS

| | | |
|---|---|---|
| KR | 10-2004-0018943 A | 3/2004 |
| KR | 10-0467435 | 1/2005 |
| KR | 10-0471970 | 3/2005 |
| WO | WO 2004/021502 * | 3/2004 |

* cited by examiner

ELECTROLYTE FOR LITHIUM ION SECONDARY BATTERY AND LITHIUM ION SECONDARY BATTERY INCLUDING THE SAME

CROSS-REFERENCE TO RELATED APPLICATION

Furthermore, the present application is related to a co-pending U.S. applications, Ser. No. 11,239,692, entitled ELECTROLYTE FOR LITHIUM ION SECONDARY BATTERY AND LITHIUM ION SECONDARY BATTERY INCLUDING THE SAME, based upon Korean Patent Application Serial No. 10-2004-0078185 filed in the Korean Intellectual Property Office on 1 Oct. 2004, and filed in the U.S. Patent & Trademark Office concurrently with the present application.

CLAIM OF PRIORITY

This application makes reference to, incorporates the same herein, and claims all benefits accruing under 35 U.S.C. §119 from an application earlier filed in the Korean Intellectual Property Office on 1 Oct. 2004 and there duly assigned Serial No. 10-2004-0078186.

BACKGROUND OF THE INVENTION

1. Field of the Invention

The present invention relates to an electrolyte for a lithium ion secondary battery and a lithium ion secondary battery including the same. More particularly, the present invention relates to an electrolyte for a lithium ion secondary battery, which provides improved safety under overcharge and high-temperature storage conditions, and a lithium ion secondary battery including the same.

2. Description of the Related Art

Recently, as the electronic industry has advanced, technical research into portable and wireless electronic instruments including telephones, video cameras and personal computers has progressed rapidly. Accordingly, as a drive source for these instruments, a secondary battery having a small size, low weight and high energy density is increasingly in demand. Particularly, a non-aqueous electrolyte-based secondary battery is greatly expected to serve as a battery having a high voltage and high energy density, wherein the non-aqueous electrolyte-based secondary battery uses a lithium-containing metal oxide providing a voltage of about 4V as a cathode active material and a carbonaceous material capable of lithium intercalation/deintercalation as an anode active material.

Such lithium ion secondary batteries generally use carbonaceous materials as an anode active material and metal oxides such as $LiCoO_2$ as a cathode active material. Additionally, a porous polyolefin-based separator is inserted between an anode and a cathode, and then a non-aqueous organic solvent containing a lithium salt added thereto is injected to complete the manufacture of a battery. During charge cycles, lithium ions are deintercalated from cathode active materials and then intercalated into carbonaceous layers of anodes. On the contrary, during discharge cycles, lithium ions are deintercalated from anode active materials and then intercalated into cathode active materials.

Lithium ion secondary batteries have an average charge/discharge voltage of about 2.7 to 4.2V and thus can provide relatively high electric power compared to other alkali batteries, Ni-MH batteries, Ni—Cd batteries, etc. However, in order to obtain such a high drive voltage level, required is an electrolyte composition electrochemically stable in the charge/discharge voltage range of lithium ion secondary batteries. Such electrochemically stable electrolytes include non-aqueous organic solvents such as ethylene carbonate, propylene carbonate, dimethyl carbonate, ethylmethyl carbonate, diethyl carbonate, etc.

Lithium ion secondary batteries using such non-aqueous organic solvents have high voltage and high energy density as well as show excellent shelf stability and low-temperature quality, and thus are widely used in portable electric products.

However, most non-aqueous organic solvents have a low flash point and high flammability. Therefore, when a battery is overcharged, lithium may be precipitated excessively at a cathode and intercalated excessively at an anode depending on charging conditions, thereby causing the cathode and anode to be in a thermally unstable state. As a result, rapid exothermic reactions may occur due to the decomposition of organic solvents used in electrolytes. Additionally, the so-called thermal runaway phenomenon may occur and the battery may be exploded or ignited. In other words, there is a serious problem related with poor battery safety.

SUMMARY OF THE INVENTION

Accordingly, the present invention has been made to solve the above-mentioned problems occurring in the prior art. An object of the present invention is to provide an electrolyte for a lithium ion secondary battery, which provides improved safety under overcharge and high-temperature storage conditions.

Another object of the present invention is to provide a lithium ion secondary battery including the same electrolyte, which shows improved safety under overcharge and high-temperature storage conditions.

In order to accomplish this object, there is provided an electrolyte for a lithium ion secondary battery, the electrolyte including a lithium salt, a non-aqueous organic solvent, gamma-butyrolactone and halogenated toluene represented by the following formula 1:

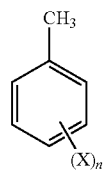

[Formula 1]

wherein X represents at least one element selected from the group consisting of F, Cl, Br and I, and n represents an integer of 1 to 5.

According to another aspect of the present invention, there is provided a lithium ion secondary battery including: an electrolyte according to the embodiment of the present invention, a cathode including a cathode active material capable of lithium ion intercalation/deintercalation, an anode including an anode active material capable of lithium ion intercalation/deintercalation, and a separator interposed between the cathode and anode.

The halogenated toluene is preferably in an amount of 5 to 15 vol % based on the total volume of the non-aqueous organic solvent.

The halogenated toluene is preferably at least one selected from the group consisting of fluorotoluene, chlorotoluene, bromotoluene, iodotoluene, difluorotoluene, dichlorotoluene, dibromotoluene, diiodotoluene, trifluorotoluene, trichlorotoluene, tibromotoluene, triiodotoluene, tetrafluorotoluene, tetrachlorotoluene, tetrabromotoluene, tetraiodotoluene, pentafluorotoluene, pentachlorotoluene, pentabromotoluene, pentaiodotoluene, chlorofluorotoluene, chlorobromotoluene, chloroiodotoluene, bromofluorotoluene and bromoiodotoluene.

More preferably, the halogenated toluene is at least one selected from the group consisting of 4-fuorotoluene, 4-bromotoluene, 4-chlorotoluene and 4-iodotoluene.

Preferably, gamma-butyrolactone is in an amount of 5 to 15 vol % based on the total volume of the non-aqueous organic solvent.

The non-aqueous organic solvents may further include an aromatic hydrocarbon-based organic solvent. Aromatic hydrocarbon-based organic solvents include an aromatic hydrocarbon compound represented by the following formula 2:

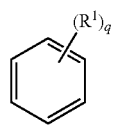

[Formula 2]

wherein $R^1$ is a halogen atom or an alkyl group having 1 to 10 carbon atoms, and q is an integer of 0 to 6.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
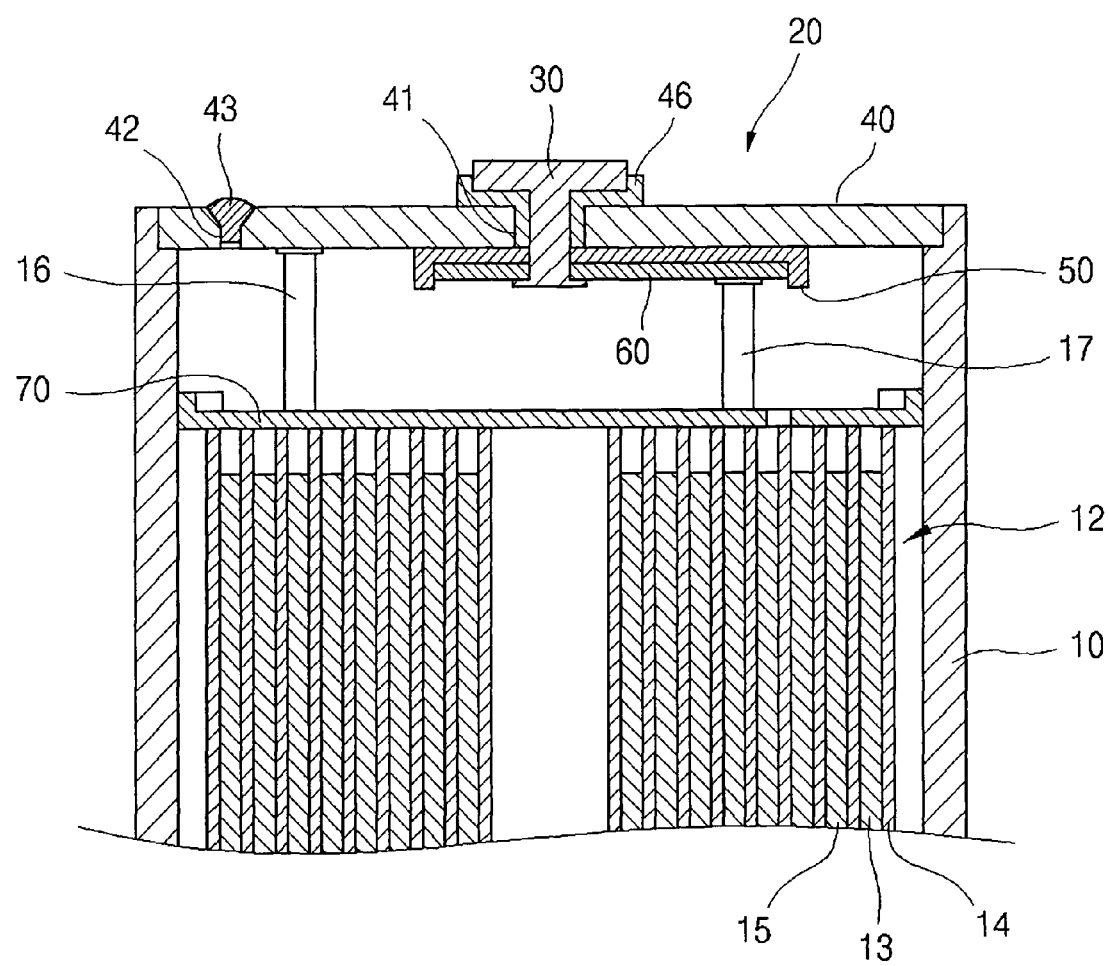
FIG. 1 is a schematic view showing the structure of a lithium ion secondary battery according to the present invention.

Hereinafter, a preferred embodiment of the present invention will be explained in more detail.

An electrolyte for a lithium ion secondary battery preferably includes a lithium salt, a non-aqueous organic solvent, gamma-butyrolactone and halogenated toluene.

Generally, although most non-aqueous organic solvents used in electrolytes having an electrochemically stable composition at a high range of charge/discharge voltage provide excellent battery life characteristics, they show significantly decreased battery safety under overcharge conditions. In order to prevent the above-mentioned problem, the halogenated toluene represented by the above formula 1 is added to electrolytes according to an embodiment of the present invention:

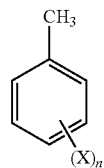

[Formula 1]

wherein X represents at least one element selected from the group consisting of F, Cl, Br and I, and n represents an integer of 1 to 5.

The halogenated toluene is preferably used in an amount of 5 to 15 vol % based on the total volume of the non-aqueous organic solvent. When the content of the halogenated toluene is less than 5 vol %, it is not possible to improve overcharge characteristics. When the content of the halogenated toluene is greater than 15 vol %, melting of a separator rather than shutdown of a separator resulting in improvement of battery safety may occur. Further, reactions including decomposition of the solvent for an electrolyte may occur.

The halogenated toluene may be at least one selected from the group consisting of fluorotoluene, chlorotoluene, bromotoluene, iodotoluene, difluorotoluene, dichlorotoluene, dibromotoluene, diiodotoluene, trifluorotoluene, trichlorotoluene, tribromotoluene, triiodotoluene, tetrafluorotoluene, tetrachlorotoluene, tetrabromotoluene, tetraiodotoluene, pentafluorotoluene, pentachlorotoluene, pentabromotoluene, pentaiodotoluene, chlorofluorotoluene, chlorobromotoluene, chloroiodotoluene, bromofluorotoluene and bromoiodotoluene.

Preferably, the halogenated toluene is at least one selected from the group consisting of 4-fuorotoluene, 4-bromotoluene, 4-chlorotoluene and 4-iodotoluene.

The halogenated toluene starts to be decomposed at a voltage of about 4.7V under overcharge conditions. During such decomposition, the reaction heat may cause a separator to be in a shutdown state, thereby improving the safety of a battery under overcharge conditions. Additionally, the halogenated toluene can prevent explosion of a battery under overcharge conditions by virtue of the polymerization resulting from coupling of benzene rings.

However, the halogenated toluene has a problem in that it cannot contribute to improve battery safety under high-temperature storage conditions, even if it can improve battery safety under overcharge conditions. Further, there is an additional problem in that other non-aqueous organic solvents may be decomposed serially due to the reaction heat of the halogenated toluene under high-temperature storage conditions.

In order to prevent the above mentioned problem, gamma-butyrolactone is further added to electrolytes along with the halogenated toluene. Gamma-butyrolactone has a boiling point of 204° C. or higher. In other words, it has a high boiling point and a high flash point, and thus shows excellent thermal stability at high temperature, which is one of the preferred characteristics for electrolytes.

Preferably, gamma-butyrolactone is used in an amount of 5 to 15 vol % based on the total volume of the non-aqueous organic solvent. When the content of gamma-butyrolactone is less than 5 vol %, it is not possible to improve battery safety under high-temperature storage conditions. When the content is greater than 15 vol %, battery safety under high-temperature conditions may be improved, but battery life characteristics may be degraded. Even if gamma-butyrolactone is added in an amount of much greater than 15 vol %, it is not possible to improve high-temperature characteristics of a battery in proportion to the added amount. Furthermore, it is not cost-efficient to increase the amount of gamma-butyrolactone.

When gamma-butyrolactone having excellent thermal properties is combined with the halogenated toluene, both the boiling point and the flash point of the resultant non-aqueous organic solvent increase. Therefore, it is possible to improve overcharge characteristics by virtue of the halogenated toluene as well as to improve high-temperature characteristics by virtue of the high boiling point and flash point. More particularly, decomposition of solvents for electrolytes and explosion of a battery can be prevented so that high-temperature characteristics may improve.

Further, gamma-butyrolactone having high thermal stability can prevent melting of a separator and decomposition of solvents for electrolytes, caused by the reaction heat resulting from decomposition of the halogenated toluene under overcharge conditions. Therefore, it is possible to further improve overcharge characteristics, while improving high-temperature characteristics at the same time.

The electrolyte includes a non-aqueous organic solvent and a lithium salt in addition to the above compounds.

The non-aqueous organic solvent functions as a medium through which ions participating in electrochemical reactions in a battery can move. The non-aqueous organic solvent includes at least one selected from the group consisting of cyclic carbonates and non-cyclic carbonates.

Particular examples of the cyclic carbonates include ethylene carbonate, propylene carbonate, butylene carbonate, vinylene carbonate, etc.

Particular examples of the non-cyclic carbonates include dimethyl carbonate, diethyl carbonate, ethyl methyl carbonate, methyl propyl carbonate, ethyl propyl carbonate, dipropyl carbonate, methyl ethyl carbonate, etc.

Additionally, such non-aqueous organic solvents may further include an aromatic hydrocarbon-based organic solvent. Aromatic hydrocarbon-based organic solvents include an aromatic hydrocarbon compound represented by the following formula 2:

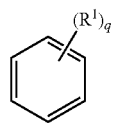

[Formula 2]

wherein $R^1$ is a halogen atom or an alkyl group having 1 to 10 carbon atoms, and q is an integer of 0 to 6.

Particular examples of the aromatic hydrocarbon-based organic solvent include benzene, fluorobenzene, bromobenzene, chlorobenzene, toluene, xylene, mesitylene, etc., each being used alone or in combination. When the non-aqueous organic solvent further includes an aromatic hydrocarbon-based organic solvent, the volume ratio of the non-aqueous organic solvent to the aromatic hydrocarbon solvent is preferably 1:1 to 30:1 in order to obtain preferred characteristics of the electrolyte.

The lithium salt serves as a source for supplying lithium ions in a battery and empowers a lithium ion secondary battery to perform basic functions. The lithium salt is any one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein, each of x and y is a natural number), LiCl and LiI, or a mixture containing two or more of them.

Hereinafter, a preferred embodiment of the secondary battery of the present invention will be described.

The lithium ion secondary battery preferably includes a cathode, an anode, a separator and the electrolyte.

The electrolyte according to the above embodiment of the present invention can be used. The electrolyte includes a lithium salt, non-aqueous organic solvent, gamma-butyrolactone and halogenated toluene.

The halogenated toluene may be at least one selected from the group consisting of fluorotoluene, chlorotoluene, bromotoluene, iodotoluene, difluorotoluene, dichlorotoluene, dibromotoluene, diiodotoluene, trifluorotoluene, trichlorotoluene, tribromotoluene, triiodotoluene, tetrafluorotoluene, tetrachlorotoluene, tetrabromotoluene, tetraiodotoluene, pentafluorotoluene, pentachlorotoluene, pentabromotoluene, pentaiodotoluene, chlorofluorotoluene, chlorobromotoluene, chloroiodotoluene, bromofluorotoluene and bromoiodotoluene.

Preferably, the halogenated toluene is at least one selected from the group consisting of 4-fuorotoluene, 4-bromotoluene, 4-chlorotoluene and 4-iodotoluene. The halogenated toluene is preferably used in an amount of 5 to 15 vol % based on the total volume of the non-aqueous organic solvent.

Gamma-butyrolactone is preferably used in an amount of 5 to 15 vol % based on the total weight of the non-aqueous organic solvent.

The cathode includes a cathode active material capable of reversible lithium ion intercalation/deintercalation. Such cathode active materials may include a lithiated intercalation oxide.

The anode includes an anode active material capable of lithium ion intercalation/deintercalation. Such anode active materials may include crystalline or amorphous carbon, carbonaceous anode active materials derived from carbon composites (pyrolyzed carbon, coke, graphite), burned organic polymer compounds, carbon fiber, tin oxide compounds, lithium metal and lithium alloys.

Slurry containing the active material is coated on a collector formed of metal foil. Otherwise, the active material itself is applied in the form of a film. The separator, which prevents a short circuit between a cathode and an anode in a lithium ion secondary battery, may include any materials known to one skilled in the art. The separator includes a polymer film such as a polyolefin, polypropylene or polyethylene film, a multi-layered film thereof, a microporous film, woven web and non-woven web.

The lithium ion secondary battery including the electrolyte, cathode, anode and separator as described above may be formed into a unit cell having the structure of cathode/separator/anode, a bi-cell having the structure of cathode/separator/anode/separator, or a laminate cell in which the structure of unit cell is repeated several times.

Referring to FIG. 1, the lithium ion secondary battery is obtained by introducing an electrode assembly including a cathode 13, an anode 15 and a separator 14 that interposes between the cathode 13 and the anode 15 into a can 10 along with an electrolyte, and then sealing the top of the can 10 with a cap assembly 20. The cap assembly 20 includes a cap plate 40, an insulating plate 50, a terminal plate 60 and an electrode terminal 30. Additionally, the cap assembly 20 is coupled with an insulation case 70 to seal the can 10.

The electrode terminal 30 is inserted into a hole 41 formed at the center of the cap plate 40. When the electrode terminal 30 is inserted into the hole 41, a gasket 46 which is preferably tube-shaped is coupled to the outer surface of the electrode terminal 30 so as to make electric insulation between the electrode terminal 30 and the cap plate 40, and thus is inserted into the hole 41 along with the electrode terminal 30. After the cap assembly is mounted on the top of the cap 10, the electrolyte is injected through an inlet 42 and then the inlet 42 is sealed with a stopper 43.

The electrode terminal 30 is connected to an anode tab 17 of the anode 15 or to a cathode tab 16 of the cathode 13, thereby functioning as an anode terminal or a cathode terminal.

The lithium ion secondary battery according to the present invention is not limited to the above-described shape but may have any other shape applicable to a battery, including a cylindrical shape, pouch shape, etc.

Reference will now be made in detail to the preferred embodiments of the present invention. It is to be understood that the following examples are illustrative only and the present invention is not limited thereto.

EXAMPLE 1

Artificial graphite as an anode active material was suspended in aqueous carboxymethyl cellulose solution and styrene-butadiene rubber as a binder was added thereto to form slurry of anode active material. The slurry was coated on copper foil having a thickness of 10 μm, dried and rolled to provide an anode.

$LiCoO_2$ as a cathode active material, polyvinylidene fluoride as a binder and carbon as a conductive agent were dispersed in N-methyl-2-pyrrolidone as a solvent to form slurry of cathode active material. The slurry was coated on aluminum foil having a thickness of 15 μm, dried and rolled to provide a cathode.

The cathode and the anode obtained as described above were wound and compressed together with a separator made of polyethylene and having a thickness of 16 μm, and then the resultant unit cell was inserted into a prismatic can having a size of 46 mm×34 mm×50 mm.

Next, an electrolyte was added to the can to provide a lithium ion secondary battery. The electrolyte was prepared by adding 1.0M of $LiPF_6$ to a mixed solvent containing ethylene carbonate and ethylmethyl carbonate (wherein volume ratio of EC:EMC=3:7) to form a mixture, and further adding gamma-butyrolactone and 4 chlorotoluene to the resultant mixture, each in the amount of 5 vol %, based on the total volume of the non-aqueous organic solvent.

EXAMPLE 2

Example 1 was repeated, except that 15 vol % of gamma-butyrolactone was added.

EXAMPLE 3

Example 1 was repeated, except that 30 vol % of gamma-butyrolactone was added.

EXAMPLE 4

Example 1 was repeated, except that 10 vol % of 4-chlorotoluene was added.

EXAMPLE 5

Example 1 was repeated, except that added were 10 vol % of 4-chlorotoluene and 15 vol % of gamma-butyrolactone.

EXAMPLE 6

Example 1 was repeated, except that 15 vol % of 4-chlorotoluene was added.

EXAMPLE 7

Example 1 was repeated, except that added were 15 vol % of 4-chlorotoluene and 15 vol % of gamma-butyrolactone.

COMPARATIVE EXAMPLE 1

Example 1 was repeated, except that neither 4-chlorotoluene nor gamma-butyrolactone was added to the electrolyte.

COMPARATIVE EXAMPLE 2

Example 1 was repeated, except that 10 vol % of 4-chlorotoluene was added to the electrolyte, and no gamma-butyrolactone was added to the electrolyte.

COMPARATIVE EXAMPLE 3

Example 1 was repeated, except that 10 vol % of gamma-butyrolactone was added to the electrolyte, and no 4-chlorotoluene was added to the electrolyte.

EXPERIMENTAL EXAMPLE

The batteries obtained from Examples 1 to 7 and Comparative Examples 1 to 3 (battery capacity 1 C=790 mAh) were charged under constant current-constant voltage (CC-CV) conditions with a current of 158 mA to a charged voltage of 4.2 V, and left for 1 hour. Then, the batteries were discharged at 395 mA to 2.75 V and left for 1 hour. After the above charge/discharge cycle was repeated three times, the batteries were charged again at a current of 395 mA for 3 hours to a charged voltage of 4.2 V.

High-temperature storage characteristics were determined by storing each battery for 1 hour at 150° C. and checking the condition of each battery.

Overcharge characteristics were determined by overcharging each battery to a voltage of 12V at 1 C.

The following Table 1 shows the test results for characteristics of each of the secondary batteries according to Examples 1-7 and Comparative Examples 1-3 under overcharge and high-temperature storage conditions.

TABLE 1

| | Base Electrolyte | 4-chloro-toluene (vol %) | GBL (vol %) | 1 C/12 V Overcharge | 150° C./1 h High-temperature Storage |
|---|---|---|---|---|---|
| Ex. 1 | 1M $LiPF_6$ | 5 | 5 | 7L0, 3L5 | 6L0, 4L5 |
| Ex. 2 | EC/EMC = | 5 | 15 | 8L0, 2L5 | 8L0, 2L5 |
| Ex. 3 | 3/7 vol % | 5 | 30 | 9L0, 1L5 | 10L0 |
| Ex. 4 | | 10 | 5 | 10L0 | 9L0, 1L5 |
| Ex. 5 | | 10 | 15 | 10L0 | 10L0 |
| Ex. 6 | | 15 | 5 | 10L0 | 9L0, 1L5 |
| Ex. 7 | | 15 | 15 | 10L0 | 10L0 |
| Comp. Ex. 1 | | — | — | 10L5 | 10L5 |
| Comp. Ex. 2 | | 10 | — | 7L0, 3L5 | 3L0, 7L5 |
| Comp. Ex. 3 | | — | 10 | 10L5 | 10L0 |

GBL used in the above Examples and Comparative Examples means gamma-butyrolactone. Each of "L0" through "L5" represents a safety grade evaluated under overcharge and high-temperature storage conditions. More particularly, "L0" means "excellent", "L1" means "leakage", "L2" means "flash", "L3" means "smoke", "L4" means "ignition", and "L5" means "explosion". The number preceding "L" means the number of cells used in this test.

As shown in Table 1, the battery using neither gamma-butyrolactone nor 4 chlorotoluene according to Comparative Example 1 caused degradation in battery quality under overcharge and high-temperature storage conditions. When 4-chlorotoluene was added to the base electrolyte solvent according to Comparative Example 2, overcharge characteristics of the battery was slightly improved. However, overcharge characteristics in this case were not fully satisfied. Moreover, the battery quality was degraded under high-temperature storage conditions.

When 10 vol % of gamma-butyrolactone was added to the base electrolyte solvent according to Comparative Example 3, high-temperature storage characteristics were improved compared to Comparative Examples 1 and 2 using no gamma-butyrolactone. However, overcharge characteristics of the battery was very poor.

Each of the batteries according to Examples 1 to 7 was tested to determine battery quality depending on variation in contents of 4-chlorotoluene and gamma-butyrolactone. When the amounts of 4-chlorotoluene and gamma-butyrolactone were increased, overcharge characteristics and high-temperature characteristics of a battery could be improved. However, overcharge characteristics and high-temperature characteristics of a battery could not be improved continuously in proportion to the added amounts of 4-chlorotoluene and gamma-butyrolactone. When each amount of 4 chlorotoluene and gamma-butyrolactone exceeds a certain limit, overcharge characteristics and high-temperature characteristics of a battery cannot be improved any more.

As can be seen from the foregoing, the lithium ion secondary battery using the electrolyte, to which halogenated toluene and gamma-butyrolactone were added according to the present invention, provides excellent overcharge characteristics as well as improved high-temperature storage characteristics, and thus shows excellent safety.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electrolyte for a lithium ion secondary battery, comprising:
   a lithium salt;
   a non-aqueous organic solvent;
   gamma-butyrolactone being in an amount of 5 to 15 vol % based on the volume of the non-aqueous organic solvent; and
   halogenated toluene represented by Formula 1, the halogenated toluene being in an amount of 5 to 15 vol % based on the volume of the non-aqueous organic solvent:

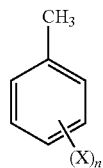

[Formula 1]

wherein X represents at least one element selected from the group consisting of F, Cl, Br and I, and n represents an integer of 1 to 5.

2. An electrolyte for a lithium ion secondary battery as claimed in claim 1, wherein the halogenated toluene is at least one selected from the group consisting of fluorotoluene, chlorotoluene, bromotoluene, iodotoluene, difluorotoluene, dichlorotoluene, dibromotoluene, diiodotoluene, trifluorotoluene, trichlorotoluene, tribromotoluene, triiodotoluene, tetrafluorotoluene, tetrachlorotoluene, tetrabromotoluene, tetraiodotoluene, pentafluorotoluene, pentachlorotoluene, pentabromotoluene, pentaiodotoluene, chlorofluorotoluene, chlorobromotoluene, chloroiodotoluene, bromofluorotoluene and bromoiodotoluene.

3. An electrolyte for a lithium ion secondary battery as claimed in claim 2, wherein the halogenated toluene is at least one selected from the group consisting of 4-fuorotoluene, 4-bromotoluene, 4-chlorotoluene and 4-iodotoluene.

4. An electrolyte for a lithium ion secondary battery as claimed in claim 1, wherein the non-aqueous organic solvent is at least one selected from the group consisting of cyclic carbonates and non-cyclic carbonates.

5. An electrolyte for a lithium ion secondary battery as claimed in claim 4, wherein the cyclic carbonate is at least one selected from the group consisting of ethylene carbonate, propylene carbonate, butylene carbonate and vinylene carbonate, and the non-cyclic carbonate is at least one selected from the group consisting of dimethyl carbonate, diethyl carbonate, ethyl methyl carbonate, methyl propyl carbonate, ethyl propyl carbonate, dipropyl carbonate and methyl ethyl carbonate.

6. An electrolyte for a lithium ion secondary battery as claimed in claim 1, wherein the non-aqueous organic solvent further includes an aromatic hydrocarbon-based organic solvent.

7. An electrolyte for a lithium ion secondary battery as claimed in claim 6, wherein the aromatic hydrocarbon-based organic solvent is an aromatic hydrocarbon compound represented by Formula 2:

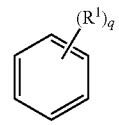

[Formula 2]

wherein $R^1$ is a halogen atom or an alkyl group having 1 to 10 carbon atoms, and q is an integer of 0 to 6.

8. An electrolyte for a lithium ion secondary battery as claimed in claim 7, wherein the aromatic hydrocarbon-based organic solvent is at least one solvent selected from the group consisting of benzene, fluorobenzene, bromobenzene, chlorobenzene, toluene, xylene, mesitylene and mixtures thereof.

9. An electrolyte for a lithium ion secondary battery as claimed in claim 1, wherein the non-aqueous organic solvent comprises a carbonate solvent and an aromatic hydrocarbon-based organic solvent, and the ratio of the carbonate solvent to the aromatic hydrocarbon-based organic solvent is in the range of 1:1 to 30:1.

10. An electrolyte for a lithium ion secondary battery as claimed in claim 1, wherein the lithium salt is one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein, each of x and y is a natural number), LiCl and LiI, or a mixture containing two or more of them.

11. A lithium ion secondary battery, comprising:
a cathode including a cathode active material capable of reversibly intercalating and deintercalating a lithium ion;
an anode including an anode active material capable of reversibly intercalating and deintercalating a lithium ion;
a separator disposed between the cathode and the anode; and
an electrolyte comprising:
a non-aqueous organic solvent;
a lithium salt;
gamma-butyrolactone being in an amount of 5 to 15 vol % based on the volume of the non-aqueous organic solvent; and
halogenated toluene represented by Formula 1, the halogenated toluene being in an amount of 5 to 15 vol % based on the volume of the non-aqueous organic solvent:

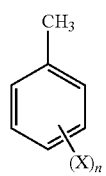

[Formula 1]

wherein X represents at least one element selected from the group consisting of F, Cl, Br and I, and n represents an integer of 1 to 5.

12. A lithium ion secondary battery as claimed in claim 11, wherein the halogenated toluene is at least one selected from the group consisting of fluorotoluene, chlorotoluene, bromotoluene, iodotoluene, difluorotoluene, dichlorotoluene, dibromotoluene, diiodotoluene, trifluorotoluene, trichlorotoluene, tribromotoluene, triiodotoluene, tetrafluorotoluene, tetrachlorotoluene, tetrabromotoluene, tetraiodotoluene, pentafluorotoluene, pentachlorotoluene, pentabromotoluene, pentaiodotoluene, chlorofluorotoluene, chlorobromotoluene, chloroiodotoluene, bromofluorotoluene and bromoiodotoluene.

13. A lithium ion secondary battery as claimed in claim 12, wherein the halogenated toluene is at least one selected from the group consisting of 4-fluorotoluene, 4-bromotoluene, 4-chlorotoluene and 4-iodotoluene.

14. A lithium ion secondary battery as claimed in claim 11, wherein the non-aqueous organic solvent is at least one selected from the group consisting of cyclic carbonates and non-cyclic carbonates.

15. A lithium ion secondary battery as claimed in claim 14, wherein the cyclic carbonate is at least one selected from the group consisting of ethylene carbonate, propylene carbonate, butylene carbonate and vinylene carbonate, and the non-cyclic carbonate is at least one selected from the group consisting of dimethyl carbonate, diethyl carbonate, ethyl methyl carbonate, methyl propyl carbonate, ethyl propyl carbonate, dipropyl carbonate and methyl ethyl carbonate.

16. A lithium ion secondary battery as claimed in claim 11, wherein the non-aqueous organic solvent further includes an aromatic hydrocarbon-based organic solvent.

17. A lithium ion secondary battery as claimed in claim 16, wherein the aromatic hydrocarbon-based organic solvent is an aromatic hydrocarbon compound represented by the following formula 2:

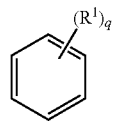

[Formula 2]

wherein $R^1$ is a halogen atom or an alkyl group having 1 to 10 carbon atoms, and q is an integer of 0 to 6.

18. A lithium ion secondary battery as claimed in claim 17, wherein the aromatic hydrocarbon-based organic solvent is at least one solvent selected from the group consisting of benzene, fluorobenzene, bromobenzene, chlorobenzene, toluene, xylene, mesitylene and mixtures thereof.

19. A lithium ion secondary battery as claimed in claim 11, wherein the non-aqueous organic solvent comprises a carbonate solvent and an aromatic hydrocarbon-based organic solvent, and the ratio of the carbonate solvent to the aromatic hydrocarbon-based organic solvent is in the range of 1:1 to 30:1.

20. A lithium ion secondary battery as claimed in claim 11, wherein the first active material is a lithiated intercalation oxide.

21. A lithium ion secondary battery as claimed in claim 11, wherein the anode active material is selected from the group consisting of crystalline carbon, amorphous carbon, carbon composites and lithium metal.

* * * * *